United States Patent
Takamuku et al.

(10) Patent No.: US 10,608,743 B2
(45) Date of Patent: Mar. 31, 2020

(54) TRANSMISSION CHARACTERISTIC COMPENSATION APPARATUS, TRANSMISSION CHARACTERISTIC COMPENSATION METHOD, AND COMMUNICATION APPARATUS

(71) Applicants: NTT ELECTRONICS CORPORATION, Yokohama-shi, Kanagawa (JP); NIPPON TELEGRAPH AND TELEPHONE CORPORATION, Tokyo (JP)

(72) Inventors: Tomohiro Takamuku, Kanagawa (JP); Etsushi Yamazaki, Kanagawa (JP); Katsuichi Oyama, Kanagawa (JP); Yasuharu Onuma, Kanagawa (JP); Kazuhito Takei, Kanagawa (JP); Masanori Nakamura, Kanagawa (JP); Mitsuteru Yoshida, Kanagawa (JP); Masahito Tomizawa, Kanagawa (JP); Yoshiaki Kisaka, Kanagawa (JP)

(73) Assignees: NTT ELECTRONICS CORPORATION, Yokohama-shi, Kanagawa (JP); NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/085,483

(22) PCT Filed: May 26, 2017

(86) PCT No.: PCT/JP2017/019756
§ 371 (c)(1),
(2) Date: Sep. 14, 2018

(87) PCT Pub. No.: WO2017/217217
PCT Pub. Date: Dec. 21, 2017

(65) Prior Publication Data
US 2019/0074903 A1   Mar. 7, 2019

(30) Foreign Application Priority Data

Jun. 17, 2016   (JP) .................................. 2016-120855

(51) Int. Cl.
*H04B 10/60* (2013.01)
*H04B 10/2507* (2013.01)
(Continued)

(52) U.S. Cl.
CPC ........... *H04B 10/2507* (2013.01); *H04B 3/10* (2013.01); *H04B 10/61* (2013.01); *H04B 10/612* (2013.01);
(Continued)

(58) Field of Classification Search
CPC ....... H03H 2021/0092; H03H 21/0012; H04B 1/10; H04L 25/03019; H04L 25/0305
See application file for complete search history.

(56) References Cited

U.S. PATENT DOCUMENTS 5,489,879 A * 2/1996 English .................. H04H 20/34
332/103
5,870,668 A * 2/1999 Takano .................. H03D 7/168
455/126

(Continued)

FOREIGN PATENT DOCUMENTS

JP   2011-199605 A   10/2011
JP   2011-223563 A   11/2011
(Continued)

OTHER PUBLICATIONS

International Preliminary Report on Patentability with Written Opinion of the International Searching Authority issued for corresponding International Patent Application No. PCT/JP2017/019756 dated Dec. 18, 2018.
(Continued)

*Primary Examiner* — Tanya T Motsinger
(74) *Attorney, Agent, or Firm* — Myers Wolin, LLC

(57) ABSTRACT

A reception circuit includes a first adaptive compensator compensating distortion of a received signal. An adaptive compensation coefficient calculator includes a known-signal detector detecting first and second known-signals from the received signal, a second adaptive compensator compensating distortion of the received signal, a tap coefficient initial value calculator calculating an initial value of a tap coefficient of the second adaptive compensator by comparing the first known-signal with its true value, a first phase shift compensator compensating phase shift of an output of the second adaptive compensator using the second known-signal, and a tap coefficient calculator calculating tap coefficients of the first and second adaptive compensators by comparing at least one of the first and second known-signals compensated by the second adaptive compensator and the first phase shift compensator with its true value.

14 Claims, 8 Drawing Sheets

(51) Int. Cl.
  H04B 3/10 (2006.01)
  H04L 27/01 (2006.01)
  H04B 10/61 (2013.01)
(52) U.S. Cl.
  CPC ....... *H04B 10/614* (2013.01); *H04B 10/6162* (2013.01); *H04L 27/01* (2013.01)

(56) References Cited

U.S. PATENT DOCUMENTS

| | | | | |
|---|---|---|---|---|
| 7,280,611 | B2* | 10/2007 | Orihashi | H03F 1/3247 375/296 |
| 2002/0126748 | A1* | 9/2002 | Rafie | H04L 27/0014 375/229 |
| 2003/0174788 | A1* | 9/2003 | Li | H04L 25/03866 375/329 |
| 2004/0246048 | A1* | 12/2004 | Leyonhjelm | H03F 1/3247 330/2 |
| 2004/0258171 | A1* | 12/2004 | Akita | H04L 25/03159 375/260 |
| 2005/0238109 | A1* | 10/2005 | Koga | H04L 27/0004 375/260 |
| 2007/0047127 | A1* | 3/2007 | Hutchins | G11B 5/035 360/65 |
| 2007/0153888 | A1* | 7/2007 | Kim | H04H 20/30 375/229 |
| 2007/0206708 | A1* | 9/2007 | Kim | H04L 1/0047 375/340 |
| 2007/0223628 | A1* | 9/2007 | Kim | H04L 25/0212 375/340 |
| 2007/0230580 | A1* | 10/2007 | Kim | H04L 25/0212 375/240.18 |
| 2008/0013616 | A1* | 1/2008 | Kim | H04H 20/57 375/232 |
| 2008/0240293 | A1* | 10/2008 | Kim | H04L 25/0232 375/316 |
| 2009/0086990 | A1* | 4/2009 | Christoph | H04R 3/04 381/71.12 |
| 2009/0116844 | A1* | 5/2009 | Tanaka | H04B 10/677 398/115 |
| 2010/0142946 | A1* | 6/2010 | Liu | H04B 10/07951 398/29 |
| 2010/0209121 | A1* | 8/2010 | Tanimura | H04B 10/611 398/202 |
| 2011/0243561 | A1 | 10/2011 | Li et al. | |
| 2013/0287390 | A1* | 10/2013 | Abe | H03H 17/0202 398/26 |
| 2013/0308960 | A1* | 11/2013 | Horikoshi | H03H 21/0012 398/209 |
| 2014/0079408 | A1 | 3/2014 | Yan et al. | |
| 2015/0180586 | A1 | 6/2015 | Oota et al. | |
| 2015/0186586 | A1 | 7/2015 | Pillai et al. | |
| 2015/0372766 | A1* | 12/2015 | Yoshida | H04B 10/2507 398/193 |
| 2018/0034552 | A1* | 2/2018 | Oyama | H04J 14/06 |
| 2019/0020531 | A1* | 1/2019 | Ge | H04L 27/364 |
| 2019/0036613 | A1* | 1/2019 | Takamuku | H04L 27/01 |
| 2019/0132051 | A1* | 5/2019 | Onuma | H04B 10/616 |

FOREIGN PATENT DOCUMENTS

| | | |
|---|---|---|
| JP | 2013-168983 A | 8/2013 |
| JP | 2014-60708 A | 4/2014 |
| JP | 2014-155194 A | 8/2014 |
| WO | WO 2012/108421 A1 | 8/2012 |

OTHER PUBLICATIONS

Office Action issued for corresponding Canadian Patent Application No. 3,019,897, dated Sep. 3, 2019.

* cited by examiner

TRANSMISSION CHARACTERISTIC COMPENSATION APPARATUS, TRANSMISSION CHARACTERISTIC COMPENSATION METHOD, AND COMMUNICATION APPARATUS

CROSS-REFERENCE TO RELATED APPLICATIONS

This application is a National Stage entry of International Application No. PCT/JP2017/019756, filed May 26, 2017, which claims priority to Japanese Patent Application No. 2016-120855, filed Jun. 17, 2016, The disclosures of the priority applications are incorporated in their entirety herein by reference.

FIELD

The present invention relates to a transmission characteristic compensation apparatus, a transmission characteristic compensation method, and a communication apparatus which compensates characteristics of a transmission path in data communication.

BACKGROUND

By compensating transmission signals for distortion using digital signal processing, coherent optical communication realizes large-capacity transmission on the order of tens of Gbits/s or more. The digital signal processing involves chromatic dispersion compensation, polarization demultiplexing/polarization mode dispersion compensation, frequency and phase shift compensation, and other processes. For further increases in capacity, there is demand to further improve compensation accuracy of the above processes.

Adaptive equalization, which is the most important function of digital signal processing, compensates a time varying situation using mainly polarization demultiplexing/polarization mode dispersion compensation, residual chromatic dispersion compensation, timing jitter compensation, and the like.

An adaptive equalizer is generally made up of a digital filter, which allows transmission signals to be compensated when tap coefficients capable of canceling distortion of the transmission signals are set on the digital filter. Thus, compensation accuracy depends on appropriateness of the tap coefficients. Various algorithms have been proposed conventionally as methods for calculating the tap coefficients.

For example, an improved version of decision directed least mean square (DD-LMS) has been proposed as an adaptive equalization algorithm, (see, for example, PTL 1). However, because the proposed technique uses a numerically-controlled oscillator in a decision-feedback loop and cannot follow phase noise variation of laser, it is difficult to implement the algorithm in a circuit.

Also, an improved version of the constant modulus algorithm (CMA) has been proposed as an adaptive equalization algorithm (see, for example, PTL 2). This method updates the tap coefficients of the filter in the adaptive equalizer such that an amplitude modulation component of an output signal will be constant, but becomes difficult to use when a multi-value level of a modulation method increases. Also, although improvements are being made towards value multiplexing, further value multiplexing is difficult.

Also, an improved version of the least mean square (LMS) algorithm has been proposed as an adaptive equalization algorithm (see, for example, PTL 3). In this method, a fixed filter corresponding to band limiting is inserted into a feedback loop.

CITATION LIST

Patent Literature

[PTL 1] JP 2011-199605 A
[PTL 2] JP 2011-223563A
[PTL 3] WO 2012/108421
[PTL 4] JP 2013-168983 A
[PTL 5] JP 2014-155194 A

SUMMARY

Technical Problem

Conventional transmission characteristic compensation apparatus have a problem in that compensation accuracy cannot be improved, which results in residual distortion being left uncorrected.

The present invention has been made to solve the above problem and has an object to provide a transmission characteristic compensation apparatus, a transmission characteristic compensation method, and a communication apparatus which can improve compensation accuracy.

Solution to Problem

A transmission characteristic compensation apparatus according to the present invention includes: a reception circuit including a first adaptive compensator compensating distortion of a received signal; and an adaptive compensation coefficient calculator, wherein the adaptive compensation coefficient calculator includes a known-signal detector detecting first and second known-signals from the received signal, a second adaptive compensator compensating distortion of the received signal, a tap coefficient initial value calculator calculating an initial value of a tap coefficient of the second adaptive compensator by comparing the first known-signal with its true value, a first phase shift compensator compensating phase shift of an output of the second adaptive compensator using the second known-signal, and a tap coefficient calculator calculating tap coefficients of the first and second adaptive compensators by comparing at least one of the first and second known-signals compensated by the second adaptive compensator and the first phase shift compensator with its true value.

Advantageous Effects of Invention

The present invention makes it possible to improve compensation accuracy.

DESCRIPTION OF EMBODIMENTS

A transmission characteristic compensation apparatus, a transmission characteristic compensation method, and a communication apparatus according to the embodiments of the present invention will be described with reference to the drawings. The same components will be denoted by the same symbols, and the repeated description thereof may be omitted.

Embodiment 1

Figure 1:
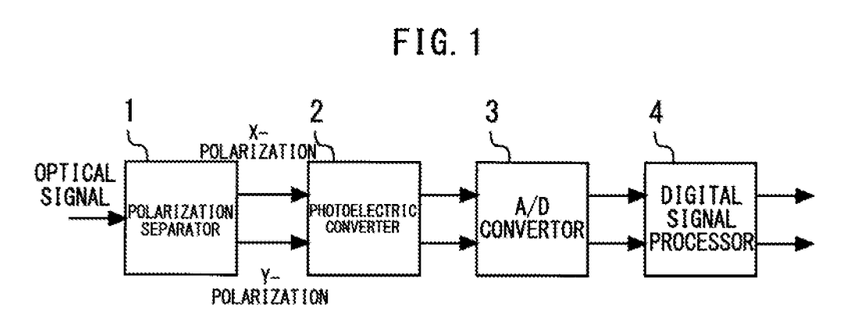
FIG. 1 is a diagram showing a communication apparatus according to Embodiment 1 of the present invention.

FIG. 1 is a diagram showing a communication apparatus according to Embodiment 1 of the present invention. The communication apparatus is a digital coherent optical receiver adapted to receive an optical signal transmitted from a transmitting side.

A polarization splitter 1 separates an optical signal into an x-polarized wave and y-polarized wave. A optical/electrical converter 2 converts a set of optical signals into analog electrical signals. An A/D (Analog to Digital) converter 3 converts a set of analog electrical signals into a set of digital electrical signals by sampling the set of analog electrical signals at a predetermined sampling frequency. A digital signal processor 4 performs digital signal processing on received signals, which are the digital electrical signals outputted from the A/D converter 3 and thereby recovers transmit data (demodulation). The digital signal processor 4 includes a transmission characteristic compensation apparatus described below.

Figure 2:
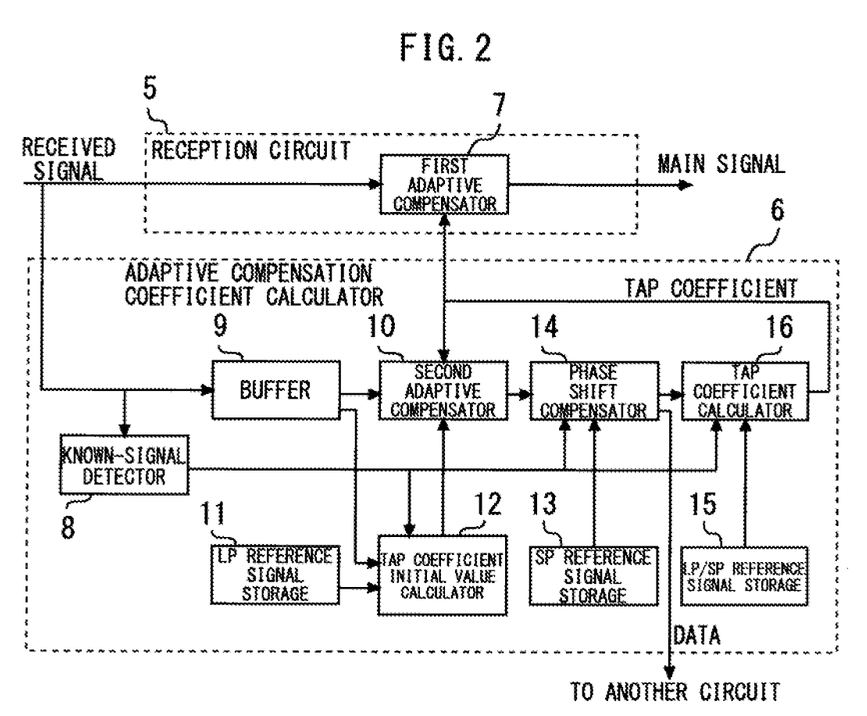
FIG. 2 is a diagram showing a transmission characteristic compensation apparatus according to Embodiment 1 of the present invention.

FIG. 2 is a diagram showing a transmission characteristic compensation apparatus according to Embodiment 1 of the present invention. Whereas a configuration of an x-polarization side will be described herein, this similarly applies to a configuration of a y-polarization side. The transmission characteristic compensation apparatus includes a reception circuit 5, and an adaptive compensation coefficient calculator 6 provided separately from the reception circuit 5. The reception circuit 5 includes a first adaptive compensator 7 compensating distortion of the received signal. The first adaptive compensator 7 is made up of a butterfly-structured FIR filter and compensates polarization demultiplexing and polarization dispersion of x-polarized and y-polarized signals and compensate residual chromatic dispersion as well. The adaptive compensation coefficient calculator 6 calculates a compensation coefficient of the first adaptive compensator 7.

Figure 3:
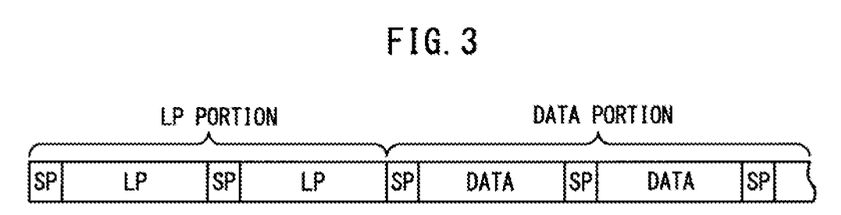
FIG. 3 is a diagram showing received signals.

FIG. 3 is a diagram showing received signals. Regarding an optical signal, on a transmit side, plural symbols with relatively long periods are inserted as successive known signals ("long-period successive known patterns; hereinafter referred to as "LPs") into a data signal and one or more symbols with relatively short periods are inserted as single-shot known signals ("short period single-shot known patterns; hereinafter referred to as "SPs"). The LPs are inserted for data synchronization in the reception circuit 5 and the SPs are inserted for phase noise compensation in the reception circuit 5. For example, as the LPs, several hundred known symbols (e.g., 128 symbols, 256 symbols, 512 symbols, or the like) are added to a transmission signal packet at the rate of one time or several times per OTU frame (Optical-channel Transport unit tens of thousands of symbols). As SPs, one to several symbols are inserted regularly every predetermined number of symbols (e.g., every tens of symbols). Note that SPs are also inserted into LP portions, but insertion intervals of SPs in LP portions may differ from insertion intervals of SPs in data portions.

In the adaptive compensation coefficient calculator 6, a known-signal detector 8 detects positions of the LPs and SPs contained in the received signal with respect to the frames. The received signal containing LPs and SPs is held in a buffer 9.

A second adaptive compensator 10 includes a butterfly-structured FIR fitter having the same configuration as the first adaptive compensator 7. Therefore, the second adaptive compensator 10 compensates the received signal outputted from the buffer 9 for polarization demultiplexing, polarization dispersion, and residual chromatic dispersion as with the first adaptive compensator 7.

An LP reference signal storage 11 prestores true values of LPs inserted into the data signal on the transmit side, as reference signals. A tap coefficient initial value calculator 12 calculates a mean square error by comparing the LPs with their true values using an MSE (Mean Square Error) algorithm and calculates such tap coefficients of the FIR filters as to minimize the mean square error, as an initial value.

An SP reference signal storage 13 prestores true values of SPs inserted into the data signal on the transmit side, as reference signals. A phase shift compensator 14 is provided with a function to compensate carrier phase rotation and compensates phase shift of the output signal of the second adaptive compensator 10 using SPs. Specifically, the phase shift compensator 14 detects a phase difference between each SP in the output signal of the second adaptive compensator 10 and the true value of the SP, and compensates the phase shift through phase rotation of the output signal of the second adaptive compensator 10 in such a way as to offset the phase difference. The phase shift compensator 14 may suppress noise by averaging phase differences detected over multiple times. Also, the phase shift compensator 14 outputs data between SPs to another circuit after phase compensation.

An LP/SP reference signal storage 15 prestores true values of LPs and SPs inserted into the data signal on the transmit side, as reference signals. Using an LMS (Least Mean Square) algorithm, a tap coefficient calculator 16 compares the LPs and SPs with the respective true values subjected to compensation processes by the second adaptive compensator 10 and phase shift compensator 14 and calculates tap coefficients of the first and second adaptive compensators 7 and 10 such that differences found as a result of the comparison will be minimized. The same tap coefficients calculated are set on the first and second adaptive compensators 7 and 10. Note that the tap coefficient calculator 16 does not always have to calculate the tap coefficients using LPs and SPs, and may calculate the tap coefficients using at least either one of LPs and SPs. Note that although this will be described later, in calculating an error signal of the LMS algorithm, that portion of phase rotation which is due to phase shift compensation is given also to the reference signals.

As described above, according to the present embodiment, the adaptive compensation coefficient calculator 6 is provided separately from the reception circuit 5 specifically for the purpose of calculating tap coefficients. Consequently, tap coefficients can be calculated with high accuracy without being affected by a process of the reception circuit 5. That is, a control circuit adapted to find only tap coefficients regardless of main signal delay is prepared independently, making it easy to perform physical layout and wiring in creating LSI. Furthermore, by holding main signal data necessary for calculation of the tap coefficients in a buffer, it becomes possible to process buffered data in software fashion by externally reading the data without hardware implementation. Data range held in the buffer, can be captured easily by determining LP/SP temporal positions based on the start position of each frame detected by the known-signal detector 8, and writing data at around the temporal positions into the buffer. Also, because the compensation processes performed by the second adaptive compensator 10 and phase shift compensator 14 reduce the influence of polarization demultiplexing, polarization dispersion, residual chromatic dispersion, and phase noise on LPs and SPs, the use of LPs and SPs allows tap coefficients to be calculated with high accuracy.

Also, because the LMS algorithm of the tap coefficient calculator 16 finds a convergence value which minimizes square error, depending on the initial value, the algorithm may converge to a wrong value without converging to an optimum convergence value. Thus, the tap coefficient initial value calculator 12 calculates the initial value of the tap coefficient of the second adaptive compensator 10 using LPs. This allows the convergence algorithm to operate starting from a value as close to the optimum convergence value as possible, making it possible to quickly calculate an optimum tap coefficient reliably by preventing convergence to a wrong value.

Example 1

Figure 4:
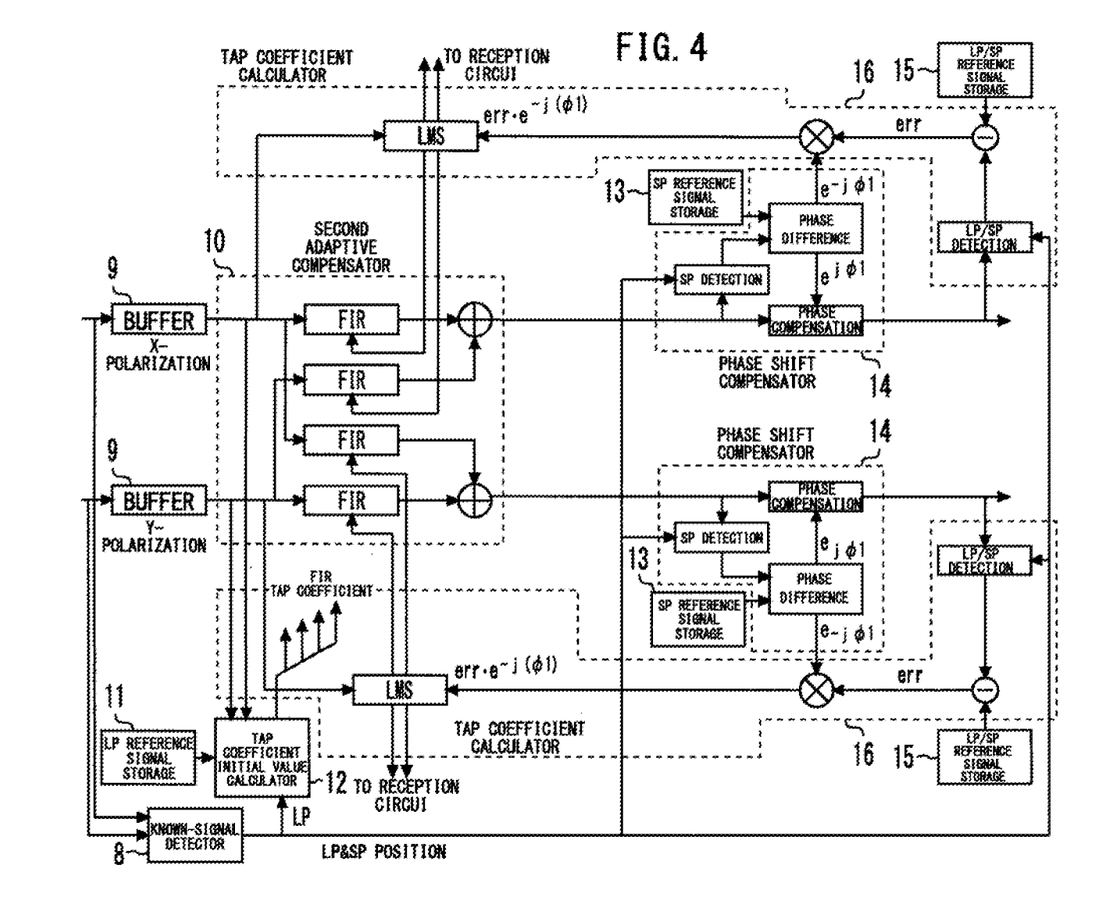
FIG. 4 is a diagram showing Example 1 of the adaptive compensation coefficient calculator according to Embodiment 1 of the present invention.

FIG. 4 is a diagram showing Example 1 of the adaptive compensation coefficient calculator according to Embodiment 1 of the present invention. The first adaptive compensator 7 of the reception circuit 5 shown in FIG. 2 receives an x-polarized wave and y-polarized wave as input, applies an FIR filter to the x-polarized wave and y-polarized wave respectively, adds calculation results, and thereby obtains an x-polarized wave output. A y-polarized wave output is obtained in a similar manner. Therefore, the FIR filter of the first adaptive compensator 7 has a two-by-two butterfly structure.

The second adaptive compensator 10 of the adaptive compensation coefficient calculator 6 includes butterfly-structured filters of the same configuration as does the first adaptive compensator 7 described above. Description will be given below of operation of Example 1 in which the optimum tap coefficient of the first and second adaptive compensators 7 and 10 is found using known signals LPs and SPs.

First, when known signals LPs and SPs are used, it is necessary to detect the temporal positions of the known signals accurately. Generally, received signals have arbitrary polarization states. Also, a center frequency may be shifted or carrier phase noise may be contained in a received signal. Even under these conditions, in the case of a series of successive known signals in which known signals occur successively, a correlation value with the series of known signals can be maintained at a high level. For example, there is a detection technique which uses a special pattern as known signals (see, for example, PTL 4). When LP positions are known, if a relationship between the LP positions and SP insertion positions are arranged in advance between the transmit side and receive side, SP positions can be learned accurately. On the other hand, in an FIR filter output, a polarization state in which transmit signals are mixed is separated more reliably together with analog polarization splitter.

The phase shift compensator 14 finds an electric field phase difference between an SP reference signal and received SP and thereby estimates phase error (rotation) of the carrier wave. Furthermore, by multiplying the FIR filter output by such an electric field as to cancel the phase error, a carrier phase in a transmit state can be recovered. In the case of QPSK (Quadrature Phase Shift Keying) modulation or 64QAM (Quadrature Amplitude Modulation) modulation, this operation makes it possible to recover a constellation in which transmit data is displayed on a polar coordinate system.

Using this signal, the tap coefficient calculator 16 finds the optimum tap coefficient of the FIR filter by means of an LMS algorithm. A typical LMS algorithm is given by the following expression.

$$h_{I/Q}(n+1) = h_{I/Q}(n) + \mu \cdot E(n) \cdot err(n)$$  [Math. 1]

where $h_{I/Q}$ is a group of tap coefficients of the FIR filter, E(n) is an input signal of the second adaptive compensator 10, err(n) is an error between the output of the second adaptive compensator 10 and the reference signal which the adaptive compensator 10 can take originally, and μ is a step size parameter for use to adjust convergence speed and residual error. In Example 1, the output of the second adaptive compensator 10 is connected with the phase shift compensator 14. Consequently, the output signal of the second adaptive compensator 10 is rotated by an angle equivalent to a phase φ1 detected by the phase shift compensator 14. Thus, err(n) equals the error between the output of the FIR filter compensated for phase and the reference signal. However, because no compensation is made by the phase shift compensator 14 at the time of passage through the FIR filter, in order to calculate an appropriate tap coefficient by removing the influence of err(n), reverse phase rotation is applied to err(n). In this case, the LMS algorithm is given by the following expression.

$$h_{I/Q}(n+1) = h_{I/Q}(n) + \mu \cdot E(n) \cdot err(n) \cdot e^{-j\phi 1}$$  [Math. 2]

As described above, by taking the influence of the phase shift compensator 14 into consideration, it is possible to find a more appropriate tap coefficient of the FIR filter. Note that an initial value is needed in calculating the LMS algorithm described above. The initial value is found by the tap coefficient initial value calculator 12.

Example 2

Figure 5:
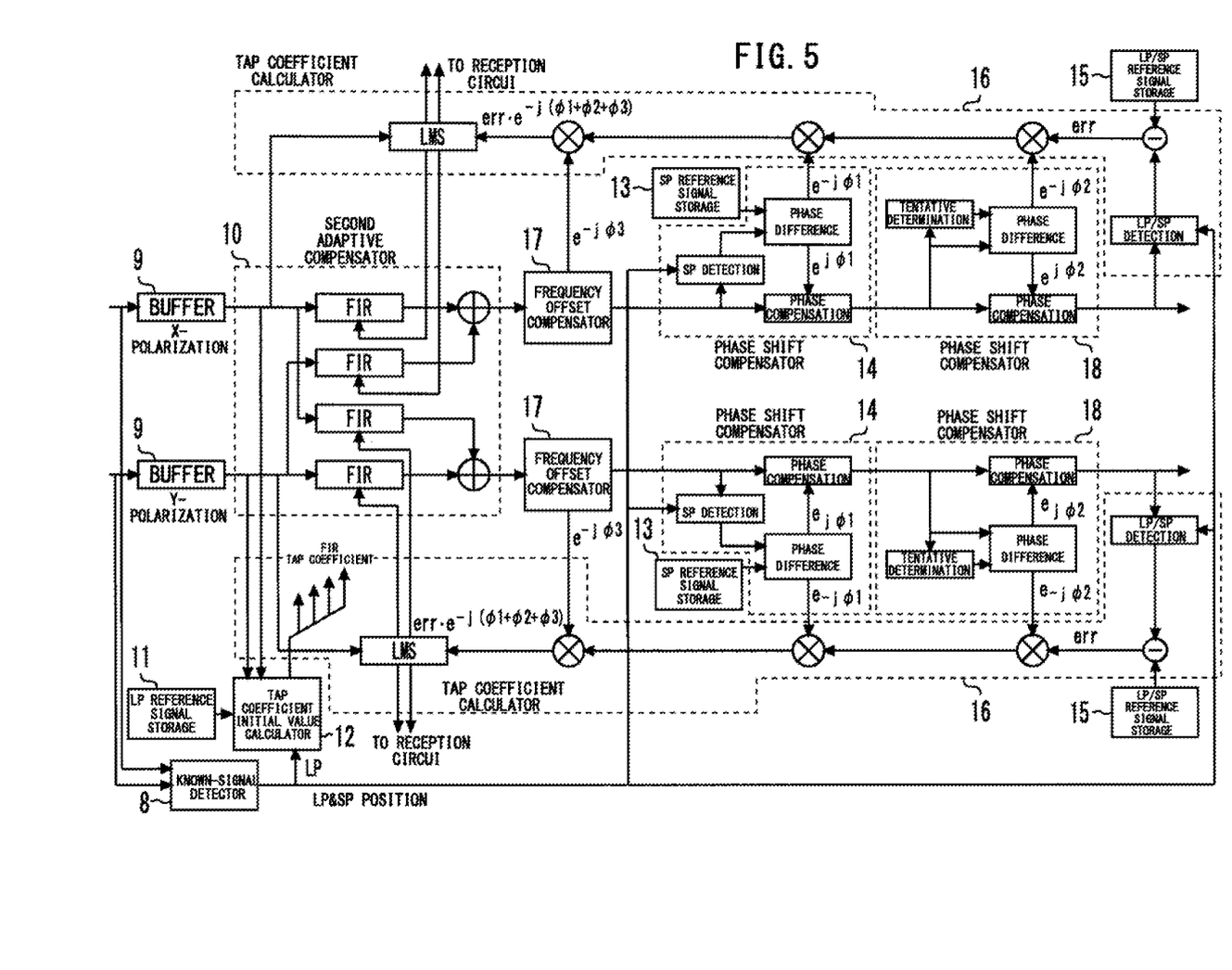
FIG. 5 is a diagram showing Example 2 of the adaptive compensation coefficient calculator according to Embodiment 1 of the present invention.

FIG. 5 is a diagram showing Example 2 of the adaptive compensation coefficient calculator according to Embodiment 1 of the present invention. In addition to the configuration of the adaptive compensation coefficient calculator 6 according to Example 1, a frequency offset compensator 17 is connected in a preceding stage of the phase shift compensator 14, and a phase shift compensator 18 is connected in a succeeding stage.

The phase shift compensator 14 estimates amounts of phase shift by comparing SPs with their true values. However, the amount of phase shift cannot be estimated accurately when a certain amount of frequency offset is exceeded. Thus, the frequency offset compensator 17 compensating a relatively large frequency offset of the output of the second adaptive compensator 10 is inserted into the preceding stage of the phase shift compensator 19. This allows the phase shift compensator 14 to perform phase shift compensation appropriately and improve resistance to frequency offset as a whole. For example, if ΔF denotes the amount of frequency offset and Fb denotes a baud rate, the frequency offset can be compensated for by rotating the phase by ΔF/Fb×2π radian on a symbol by symbol basis.

Even if frequency offset (phase rotation ϕ3) is performed in this way, the error signal err(n) used for the LMS algorithm needs to be multiplied by the phase rotation of the symbol in which the error is found, with the sign reversed (−ϕ3).

Also, when detecting an amount of carrier phase rotation using SPs, the phase shift compensator 14 can detect a frequency offset residue by finding an amount of time differential of the detected value of the phase rotation (see, for example, PTL 5).

Furthermore, the phase shift compensator 18 compensating the carrier phase of the output of the phase shift compensator 14 using a data pattern of the received signal is added to a succeeding stage of the phase shift compensator 14 compensating the carrier phase using SPs. The tap coefficient calculator 16 compares the LPs and SPs with the respective true values subjected to compensation processes by the second adaptive compensator 10 and phase shift compensators 14 and 18 and calculates tap coefficients of the first and second adaptive compensators 7 and 10 such that differences found as a result of the comparison will be minimized. In carrier phase compensation using SPs, depending on the insertion intervals of SPs, phase noise (phase shift) cannot be removed sufficiently, and consequently, phase noise remains. If the residue is phase noise, the phase noise can be estimated using a data pattern rather than a known signal. By finding the error signal err(n) of the LMS algorithm using an output (phase rotation ϕ2) of the phase shift compensator 18, the phase noise can be reduced. The error signal err(n) actually inputted to the LMS algorithm is given by the following expression by taking into consideration the influence of a phase rotation amount ϕ2 caused by the phase shift compensator 18 and a phase rotation amount ϕ3 caused by the frequency offset compensator 17.

$$h_{I/O}(n+1) = h_{I/O}(n) + \mu \cdot E(n) \cdot err(n) \cdot e^{-j(\phi 1 + \phi 2 + \phi 3)}$$ [Math. 3]

As described above, Example 2 allows filter coefficients to be calculated with the influence of phase noise minimized. Thus, the tap coefficients of filters can be found with higher accuracy.

Being able to calculate tap coefficients with high accuracy in this way, a phase compensation apparatus according to the present embodiment can improve compensation accuracy. The communication apparatus using the phase compensation apparatus improves receiver sensitivity. Also, because there is no need to provide a feedback loop in the reception circuit 5 to calculate tap coefficients, processes of the reception circuit 5 is not affected by transient situations of the feedback loop. Thus, high-speed processing can be performed with respect to a main signal line of the reception circuit 5.

Also, the use of data-synchronization LPs for LMS initial value calculation allows the LMS to converge reliably by preventing false convergence of the LMS. Also, the use of SPs inserted regularly every tens of symbols increases the update frequency of tap coefficient calculation, making it possible to deal with polarization fluctuations on the order of 100 kHz.

Embodiment 2

Figure 6:
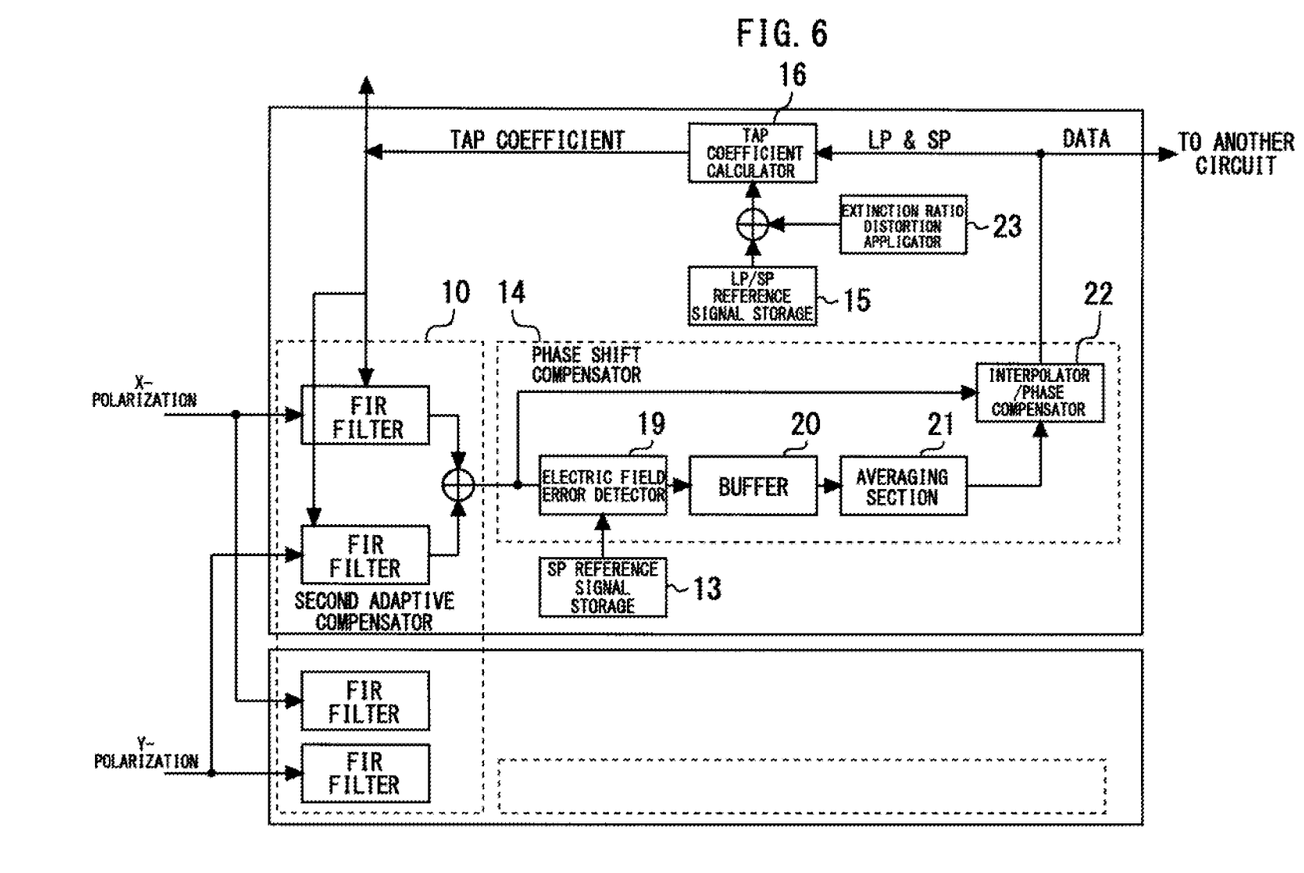
FIG. 6 is a diagram showing an adaptive compensation coefficient calculator according to Embodiment 2 of the present invention.

FIG. 6 is a diagram showing an adaptive compensation coefficient calculator according to Embodiment 2 of the present invention. Illustration of the adaptive compensation coefficient calculator 6, buffer 9, and tap coefficient initial value calculator 12 is omitted. Also, whereas a configuration of the x-polarization side will be described, this similarly applies to a configuration of the y-polarization side.

Figure 7:
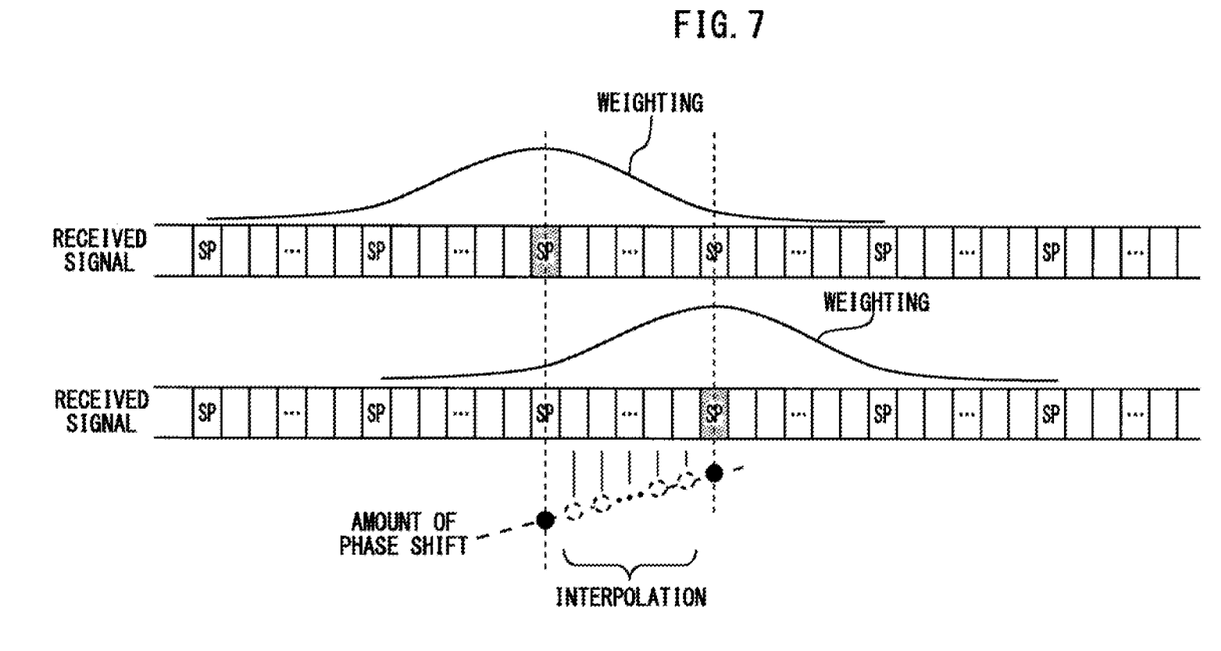
FIG. 7 is a diagram showing operation of the phase shift compensator according to Embodiment 2 of the present invention.

A phase shift compensator 14 includes an electric field error detector 19, a buffer 20, an averaging section 21, and an interpolator/phase compensator 22. FIG. 7 is a diagram showing operation of the phase shift compensator according to Embodiment 2 of the present invention. The electric field error detector 19 detects electric field errors between SPs in a received signal and true values of the SPs. The electric field errors correspond to coordinate differences of SPs mapped on a complex plane and represent the amount of phase shift.

The detected amounts of phase shift is accumulated in the buffer 20, and then averaged over a predetermined number of SPs by the averaging section 21. In FIG. 7, five SPs are averaged by being weighted using a Gaussian distribution. When the SPs closer to the central part are assigned with higher weight in this way, the accuracy is improved. Note that weighting is not limited to a Gaussian distribution. Subsequent five SPs are also averaged to obtain a moving average.

The interpolator/phase compensator 22 complements between each SP using the amounts of phase shift of adjacent SPs, estimates the amounts of phase shift of each data among the SPs, and compensates the phase of the data and the SPs by the amount of phase shift. The compensated data is sent to other circuits and the compensated LPs and SPs are sent to the tap coefficient calculator 16. This improves the effect of phase noise compensation and thereby improves accuracy of tap coefficient calculation by the tap coefficient calculator 16 in the next stage.

Also, an extinction ratio distortion applicator 23 applies extinction ratio distortion to the true values of both LP and SP. The tap coefficient calculator 16 compares the LP and SP compensated by the second adaptive compensator 10 and phase shift compensator 14 with the true values of the LP and SP to which the extinction ratio distortion has been applied. Note that when the tap coefficient calculator 16 calculates the tap coefficient using one of the LP and SP, the extinction ratio distortion applicator 23 applies extinction ratio distortion to only the appropriate one of the true values of the LP and SP.

The distortion of the extinction ratio corresponds to a DS offset with respect to an optical signal passing through optical fiber. When the tap coefficient is calculated, the extinction ratio has not yet been compensated for distortion, so the extinction ratio distortion remains in the received signal. Thus, comparison with the true values of the LP and SP to which the extinction ratio distortion has been applied allows any polarization dispersion existing in the received signal to be detected with higher accuracy, making it possible to calculate the tap coefficient with high accuracy.

Embodiment 3

Figure 8:
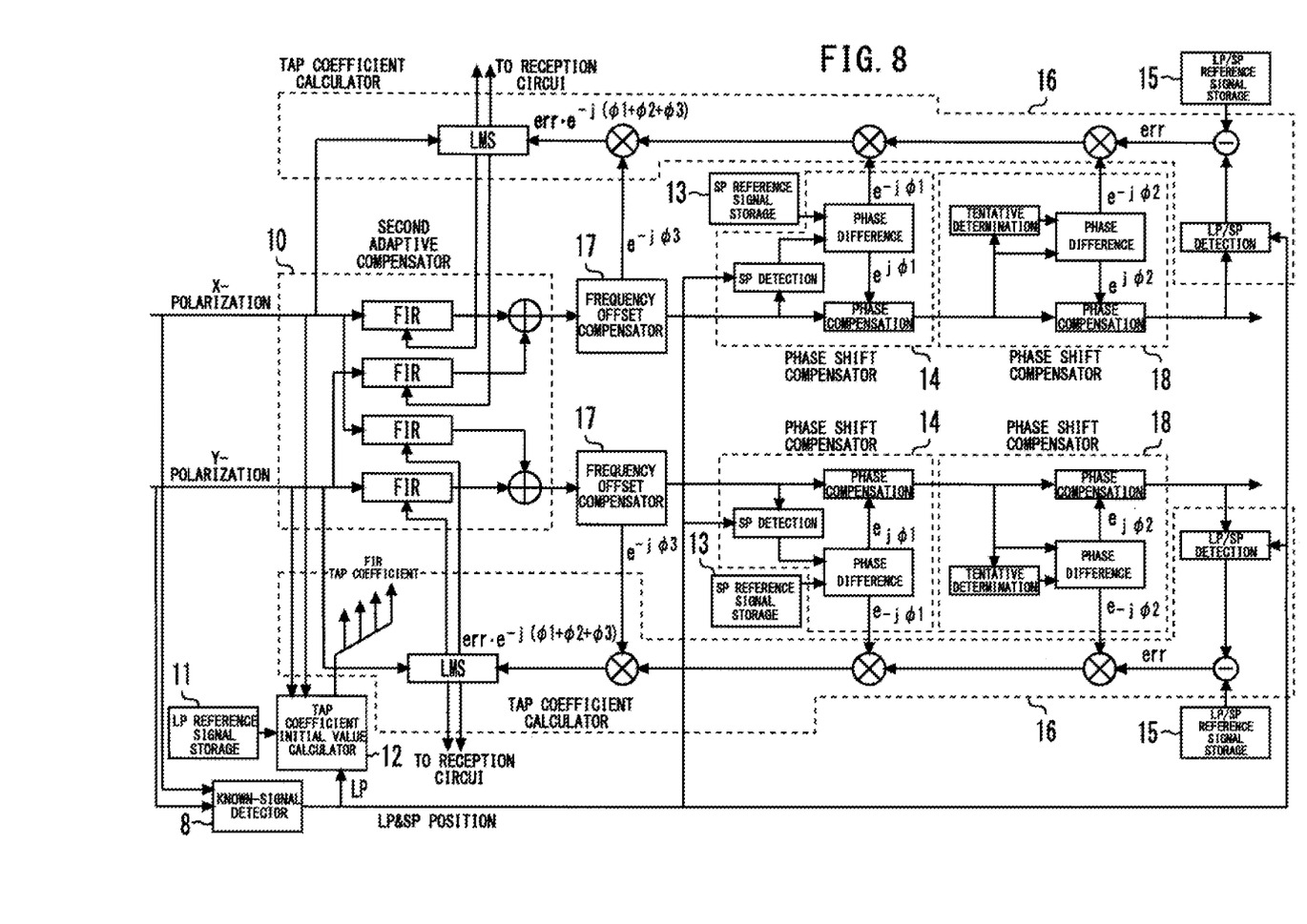
FIG. 8 is a diagram showing an adaptive compensation coefficient calculator according to Embodiment 3 of the present invention.

FIG. 8 is a diagram showing an adaptive compensation coefficient calculator according to Embodiment 3 of the present invention in the present embodiment, unlike in Example 2 of FIG. 5, the buffer 9 is not mounted on the adaptive compensation coefficient calculator 6. If the buffer 9 is mounted as with Example 2, the tap coefficient can be found by software independently of the main signal, but even the configuration of the present embodiment makes it easy to perform physical layout and wiring in the reception circuit 5.

Embodiment 4

Figure 9:
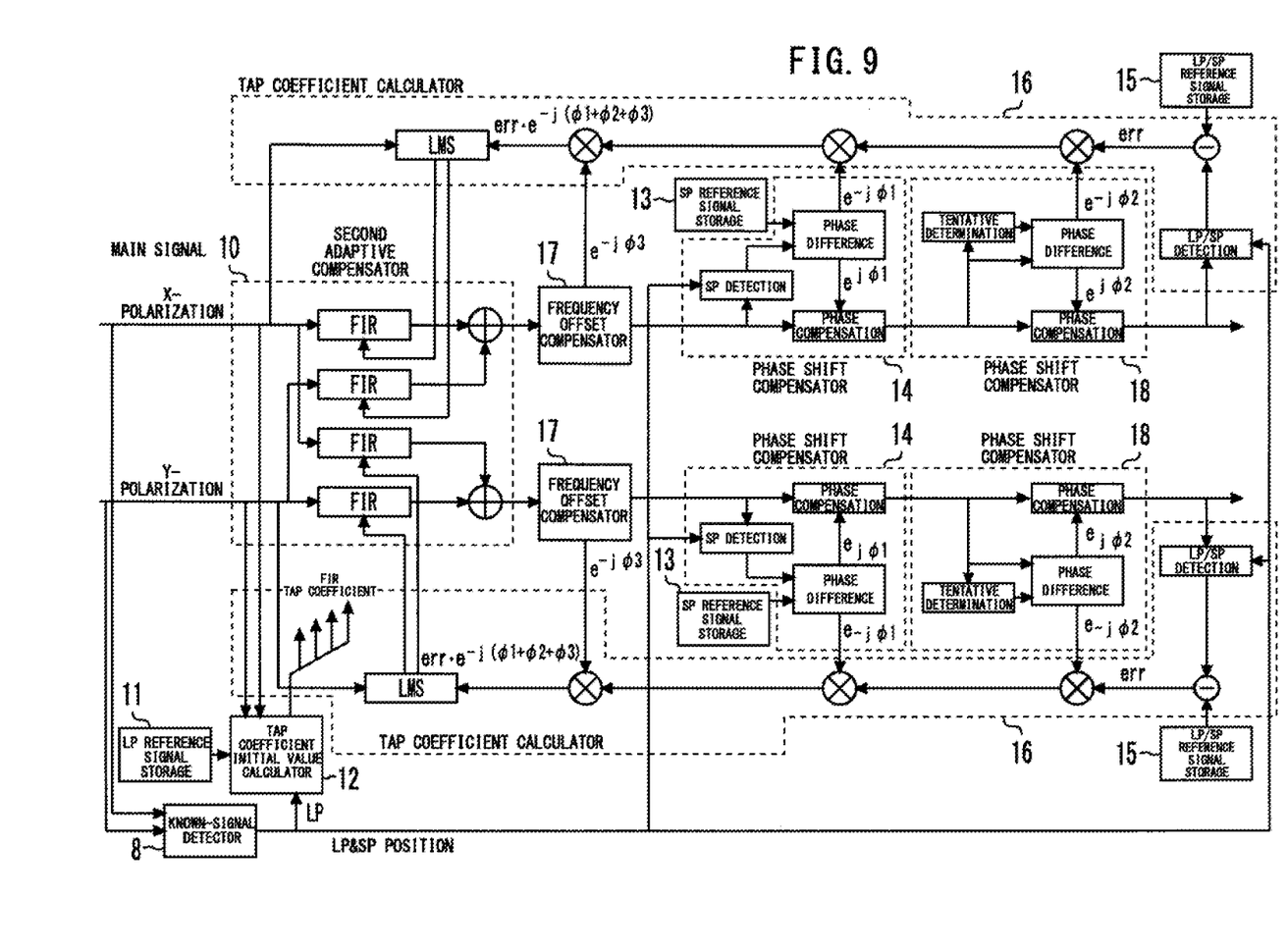
FIG. 9 is a diagram showing a transmission characteristic compensation apparatus according to Embodiment 4 of the present invention.

FIG. 9 is a diagram showing a transmission characteristic compensation apparatus according to Embodiment 4 of the present invention in Embodiments 1 to 3, tap coefficients are calculated by the adaptive compensation coefficient calculator 6 provided separately from the reception circuit 5. In contrast, in the present embodiment, the adaptive compensation coefficient calculator 6 of Embodiment 3 is provided in the reception circuit 5. Even in this case, tap coefficients can be calculated with high accuracy by calculating the tap coefficients after performing phase shift compensation.

A program for implementing the functions of the adaptive compensation coefficient calculator 6 according to the first to fourth embodiment may be recorded in a computer-readable recording medium so that the program recorded in the recording medium is read in and executed by a computer system or a programmable logic device to perform compensation coefficient calculation. The "computer system" described here, may contain hardware such as OS, peripheral equipment, etc. The "computer system" may contain a WWW system having a homepage providing environment (or displaying environment). The "computer-readable recording medium" may be a portable medium such as a flexible disc, a magneto-optic disc, ROM and CD-ROM, or a storage device such as a hard disc incorporated in a computer system. Furthermore, the "computer-readable recording medium" may contain an element for holding a program for a constant time like a volatile memory (RAM) in a computer system serving as a server or a client when a program is transmitted through a network such as the Internet or a communication line such as a telephone line. The program may be transmitted from a computer system having a storage device or the like in which the program is stored, to another computer system via a transmission medium or by transmission waves in a transmission medium. Here, the "transmission medium" for transmitting the program is a medium having a function of transmitting information like a network (communication network) such as the Internet or a communication circuit (communication line) such as a telephone line or the like. The program may be provided to perform a part of the foregoing function. Furthermore, the program may be provided to perform the foregoing function in combination with a program which has been already stored in the computer system, so-called a differential file (differential program).

REFERENCE SIGNS LIST 2 optical/electrical converter, 3 A/D converter, 5 reception circuit, 6 adaptive compensation coefficient calculator, 7 first adaptive compensator, 8 known-signal detector, 10 second adaptive compensator, 12 tap coefficient initial value calculator, 14 phase shift compensator, 16 tap coefficient calculator, 23 extinction ratio distortion applicator

The invention claimed is:

1. A transmission characteristic compensation apparatus comprising:
a reception circuit including a first adaptive compensator compensating at least time-varying distortion of a received signal; and
an adaptive compensation coefficient calculator that is provided on a signal path separated from a signal path of the reception circuit,
wherein the adaptive compensation coefficient calculator includes
a known-signal detector detecting first and second known-signals from the received signal,
a second adaptive compensator compensating at least time-varying distortion of the received signal, the second adaptive compensator being connected with the first adaptive compensator in parallel, the second adaptive compensator being used for calculating tap coefficients of the first adaptive compensator from the received signal,
a tap coefficient initial value calculator calculating an initial value of a coefficient of the second adaptive compensator by comparing the first known-signal with its true value,
a first phase shift compensator compensating phase shift of an output of the second adaptive compensator using the second known-signal, and
a tap coefficient calculator, wherein the first phase shift compensator is provided at an input side of the tap coefficient calculator, and the tap coefficient calculator calculates the tap coefficients of the first adaptive compensator and tap coefficients of the second adaptive compensator by comparing at least one of the first and second known-signals compensated by the second adaptive compensator and the first phase compensator with its true value.

2. The transmission characteristic compensation apparatus according to claim 1, wherein the first known-signal is inserted for data synchronization in the reception circuit and the second known-signal is inserted for phase noise compensation in the reception circuit.

3. The transmission characteristic compensation apparatus according to claim 1, wherein the tap coefficient calculator calculates the tap coefficients using an LMS (Least Mean Square) algorithm.

4. The transmission characteristic compensation apparatus according to claim 1, wherein the tap coefficient initial value calculator calculates the initial value using an MSE (Mean Square Error) algorithm.

5. The transmission characteristic compensation apparatus according to claim 1, wherein the first and second adaptive compensators include FIR filters having same configurations.

6. The transmission characteristic compensation apparatus according to claim 1, further comprising a frequency offset compensator connected in a preceding stage of the first phase shift compensator and compensating a frequency offset of the output of the second adaptive compensator.

7. The transmission characteristic compensation apparatus according to claim 1, further comprising a second phase shift compensator compensating a carrier phase of an output of the first phase compensator using a data pattern of the received signal, wherein the tap coefficient calculator calculates the tap coefficients of the first and second adaptive compensators by comparing at least one of the first and second known-signals compensated by the second adaptive compensator and the first and second phase shift compensators with its true value.

8. The transmission characteristic compensation apparatus according to claim 1, further comprising an extinction ratio distortion applicator applying extinction ratio distortion to at least, one of true values of the first and second known-signals,
wherein the tap coefficient calculator compares at least one of the first and second known-signals compensated by the second adaptive compensator and the first phase shift compensator with its true value to which the extinction ratio distortion has been applied.

9. The transmission characteristic compensation apparatus according to claim 1, wherein the adaptive compensation coefficient calculator is provided separately from the reception circuit.

10. The transmission characteristic compensation apparatus according to claim 9, wherein the adaptive compensation coefficient calculator includes a buffer holding the received signal.

11. The transmission characteristic compensation apparatus according to claim 1, wherein the adaptive compensation coefficient calculator is provided in the reception circuit.

12. A transmission characteristic compensation method performed by a transmission characteristic compensation apparatus comprising:
compensating at least time-varying distortion of a received signal by a first adaptive compensator of a reception circuit;
detecting first and second known-signals from the received signal;
compensating at least time-varying distortion of the received signal by a second adaptive compensator of an adaptive compensation coefficient calculator, the adaptive compensation coefficient calculator being provided on a signal path separated from a signal path of the reception circuit, the second adaptive compensator being connected with the first adaptive compensator in parallel;
calculating an initial value of a tap coefficient of the second adaptive compensator by comparing the first known-signal with its true value;
compensating phase shift of an output of the second adaptive compensator using the second known-signal; and
calculating, by a tap coefficient calculator of the adaptive compensation coefficient calculator, tap coefficients of the first and second adaptive compensators by comparing at least one of the first and second known-signals whose distortion and phase shift are compensated with its true value, wherein the first phase shift compensator is provided at an input side of the tap coefficient calculator, and the second adaptive compensator is used for calculating the tap coefficients of the first adaptive compensator from the received signal.

13. A communication apparatus comprising:
a photoelectric converter converting an optical signal into an analog electrical signal;
an A/D converter converting the analog electrical signal into the received signal that is a digital electrical signal; and
a transmission characteristic compensation apparatus comprising:
a reception circuit including a first adaptive compensator compensating at least time-varying distortion of the received signal; and
an adaptive compensation coefficient calculator that is provided on a signal path separated from a signal path of the reception circuit,
wherein the adaptive compensation coefficient calculator includes
a known-signal detector detecting first and second known-signals from the received signal,
a second adaptive compensator compensating at least time-varying distortion of the received signal, the second adaptive compensator being connected with the first adaptive compensator in parallel, the second adaptive compensator being used for calculating tap coefficients of the first adaptive compensator from the received signal,
a tap coefficient initial value calculator calculating an initial value of a coefficient of the second adaptive compensator by comparing the first known-signal with its true value,
a first phase shift compensator compensating phase shift of an output of the second adaptive compensator using the second known-signal, and
a tap coefficient calculator, wherein the first phase shift compensator is provided at an input side of the tap coefficient calculator, and the tap coefficient calculator calculates the tap coefficients of the first adaptive compensator and tap coefficients of the second adaptive compensator by comparing at least one of the first and second known-signals compensated by the second adaptive compensator and the first phase compensator with its true value.

14. The transmission characteristic compensation apparatus according to claim 1, wherein the second adaptive compensator is used specifically for calculating the tap coefficients of the first adaptive compensator from the received signal.

* * * * *